United States Patent
Lin et al.

(10) Patent No.: US 9,652,188 B2
(45) Date of Patent: May 16, 2017

(54) IMAGE FORMING APPARATUS, METHOD FOR CONTROLLING IMAGE FORMING APPARATUS, AND COMPUTER-READABLE STORAGE MEDIUM STORING PROGRAM FOR EXECUTING AN OPERATION BASED ON A STORAGE MODE OF THE IMAGE FORMING APPARATUS

(71) Applicant: CANON KABUSHIKI KAISHA, Tokyo (JP)

(72) Inventors: Zhi Lin, Kawasaki (JP); Takayuki Kaneko, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/551,936

(22) Filed: Nov. 24, 2014

(65) Prior Publication Data
US 2015/0153986 A1  Jun. 4, 2015

(30) Foreign Application Priority Data
Nov. 29, 2013  (JP) .................................. 2013-248034

(51) Int. Cl.
*G06F 3/12*  (2006.01)

(52) U.S. Cl.
CPC .......... *G06F 3/1267* (2013.01); *G06F 3/1204* (2013.01); *G06F 3/1257* (2013.01); *G06F 3/1285* (2013.01); *G06F 3/1222* (2013.01); *G06F 3/1238* (2013.01)

(58) Field of Classification Search
None
See application file for complete search history.

(56) References Cited

U.S. PATENT DOCUMENTS

| | | | |
|---|---|---|---|
| 2007/0019231 A1* | 1/2007 | Maeshima | G03G 21/00 358/1.15 |
| 2009/0153901 A1* | 6/2009 | Imamura | G06F 21/608 358/1.15 |
| 2010/0225964 A1* | 9/2010 | Furukawa | G06F 3/1204 358/1.15 |
| 2013/0114103 A1* | 5/2013 | Oishi | G06F 3/1204 358/1.15 |

FOREIGN PATENT DOCUMENTS

JP  2009-143081 A  7/2009
KR  10-2005-0045938 A  5/2005

* cited by examiner

*Primary Examiner* — Andrew H Lam
(74) *Attorney, Agent, or Firm* — Canon U.S.A., Inc. IP Division

(57) ABSTRACT

An image forming apparatus includes a storage unit having a first storage area and a second storage area, and a control unit configured to store externally input print data in the first storage area when the image forming apparatus is operating in a forcible storage mode. The control unit, if a storage instruction is added to the externally input print data, stores the input data in the second storage area, not in the first storage area.

15 Claims, 12 Drawing Sheets

| DRIVER | 0001-10992 | ~1201 |
|--------|------------|-------|
| OTHER  | 0002-12123 | ~1202 |
| ......  | ......      |       |

IMAGE FORMING APPARATUS, METHOD FOR CONTROLLING IMAGE FORMING APPARATUS, AND COMPUTER-READABLE STORAGE MEDIUM STORING PROGRAM FOR EXECUTING AN OPERATION BASED ON A STORAGE MODE OF THE IMAGE FORMING APPARATUS

BACKGROUND OF THE INVENTION

Field of the Invention

The present invention relates to an image forming apparatus capable of reserving received print data in a storage device, and starting printing according to an instruction of a user via an operation unit.

Description of the Related Art

Known image forming apparatuses have a function called a box function. The image forming apparatus having the box function stores print data sent by a printer driver of a personal computer (PC) into a storage area called a box in a hard disk. A user can start printing of the print data stored in the box using an operation panel at desired timing.

In recent image forming apparatuses, to increase the level of security and to prevent print products from being left, an operation mode can be set to a forcible reservation mode. The image forming apparatus operating in the forcible reservation mode forcibly stores received data in a hard disk regardless of whether the data sent from a PC is an instruction to perform printing or an instruction to reserve the data. A user who has issued a transmission instruction with the PC moves in front of the image forming apparatus to log into the image forming apparatus, and instructs to print the forcibly reserved data using an operation panel. Through the user operation, the reserved data is printed.

Japanese Patent Application Laid-Open No. 2009-143081 proposes an image forming apparatus that performs control to forcibly reserve a print job of N or more sheets, or a print job of a specific user.

When the data is forcibly reserved in the forcible reservation mode, however, data to be stored in a box is also temporarily reserved in a storage area where data is forcibly reserved, and the data is not stored in the box until the user issues an instruction in front of the image forming apparatus.

SUMMARY OF THE INVENTION

The present invention provides, in an image forming apparatus capable of operating in a forcible reservation mode, a means for performing control to store received print data into an appropriate area.

According to an aspect of the present invention, an image forming apparatus includes a storage unit having a first storage area and a second storage area, and a control unit configured to store externally input print data in the first storage area when the image forming apparatus is operating in a forcible storage mode, wherein the control unit, if a storage instruction is added to the externally input print data, stores the input data in the second storage area, not in the first storage area.

According to exemplary embodiments of the present invention, in an image forming apparatus that operates in a forcible reservation mode, it is possible to appropriately switch to which storage area in a storage unit the received print data is to be stored, so that the convenience can be increased.

Further features of the present invention will become apparent from the following description of exemplary embodiments with reference to the attached drawings.

BRIEF DESCRIPTION OF THE DRAWINGS

FIG. 7 is a list of print data being reserved in a box area.

FIG. 11 illustrates values of application identifications (IDs).

DESCRIPTION OF THE EMBODIMENTS

Various exemplary embodiments, features, and aspects of the invention will be described in detail below with reference to the drawings.

In this exemplary embodiment, in a multifunctional peripheral (MFP) that operates in a forcible reservation mode, an example of control to store print data sent from a personal computer (PC) 101 into a forcible reservation area or a box storage area is described.

Figure 1:
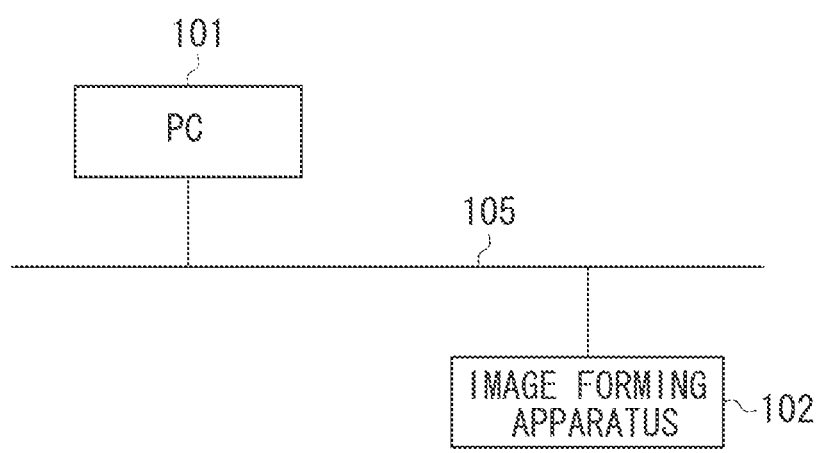
FIG. 1 is a configuration diagram illustrating a forcible reservation printing system.

FIG. 1 is a configuration diagram illustrating a forcible reservation printing system. The system includes the PC 101. A MFP 102 has integrated functions of a scanner and a printer. The PC 101 has a function to generate data for printing from a document by a printer driver described below and to send the data to the MFP 102. The MFP 102 has a function to reserve the print data sent from the PC 101 in a storage device such as a hard disk. The PC 101 and the MFP 102 are communicably interconnected via a local area network (LAN).

In this exemplary embodiment, the system in which the PC 101 and the MFP 102 are connected via the network is described. The reservation printing system is not limited to this example. Alternatively, for example, a system connected via a universal serial bus (USB) interface (I/F), or a parallel I/F can be employed. Further, instead of reserving the print data in the hard disk in the MFP 102, the reservation printing system can reserve the print data in an external hard disk connected to the MFP 102. Furthermore, the print data can be reserved in a file server such as a network attached storage (NAS) connected to a LAN. Moreover, the print data can be reserved in a server for providing cloud service on the Internet. In this exemplary embodiment, as an example of an information processing apparatus, the PC 101 is described. The information processing apparatus is not limited to the PC 101, and alternatively, mobile terminals such as a smart phone, or a notebook computer can be employed. In this exemplary embodiment, as an example of an image forming apparatus, the MFP 102 is described. The image forming apparatus is not limited to the MFP 102, and alternatively, for example, a printing apparatus having only a print function can be employed.

Figure 2:
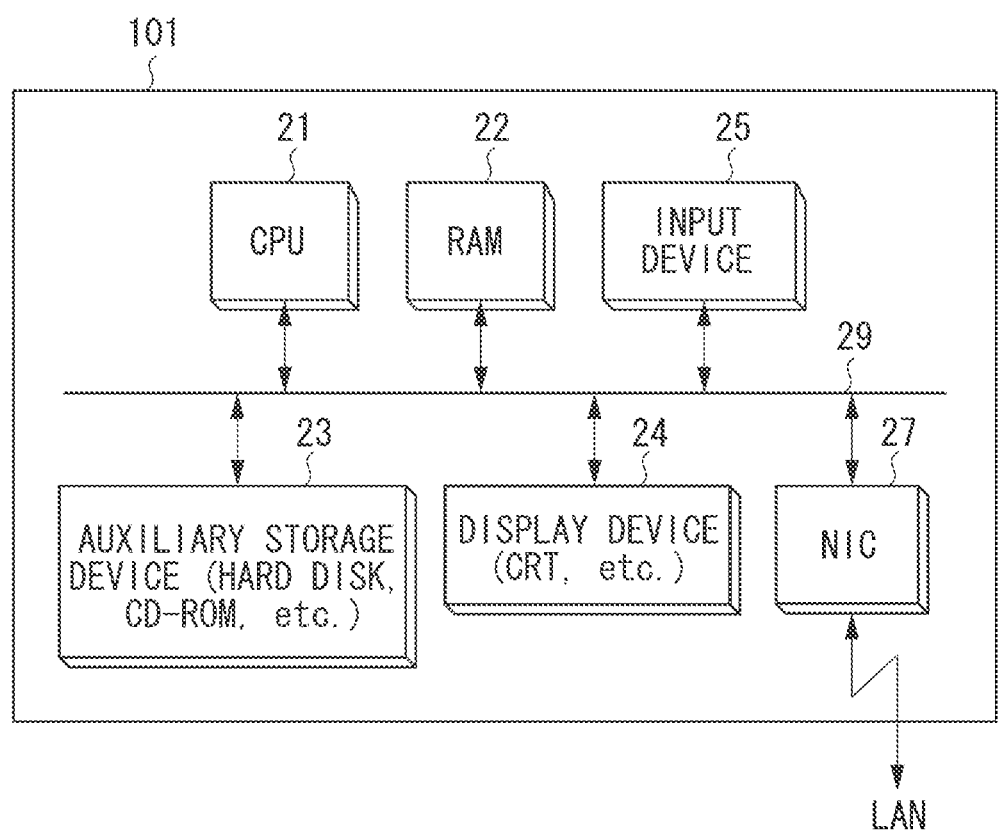
FIG. 2 illustrates a hardware configuration of a PC.

FIG. 2 illustrates a hardware configuration of the PC 101. The PC 101 includes a central processing unit (CPU) 21. A random access memory (RAM) 22 provides a work area of the CPU 21. An auxiliary storage unit 23 stores a control program. The auxiliary storage unit 23 can be a hard disk or a compact disc read-only memory (CD-ROM). The auxiliary storage unit 23 stores a printer driver program (hereinafter, referred to as a printer driver). The CPU 21 executes a printer driver so that the PC 101 generates page description language (PDL) data based on document data created by a document creation application, and sends the data to the MFP 102.

A display device (for example, a cathode-ray tube (CRT) display, and a liquid crystal display) 24 is used to notify a user of a message, and to display an operation screen. An input device (for example, a mouse, and a keyboard) 25 is used to enter a user's command. A network interface card (NIC) 27 is used to exchange data with other network devices via a LAN. The PC 101 uses a main bus 29.

Figure 3:
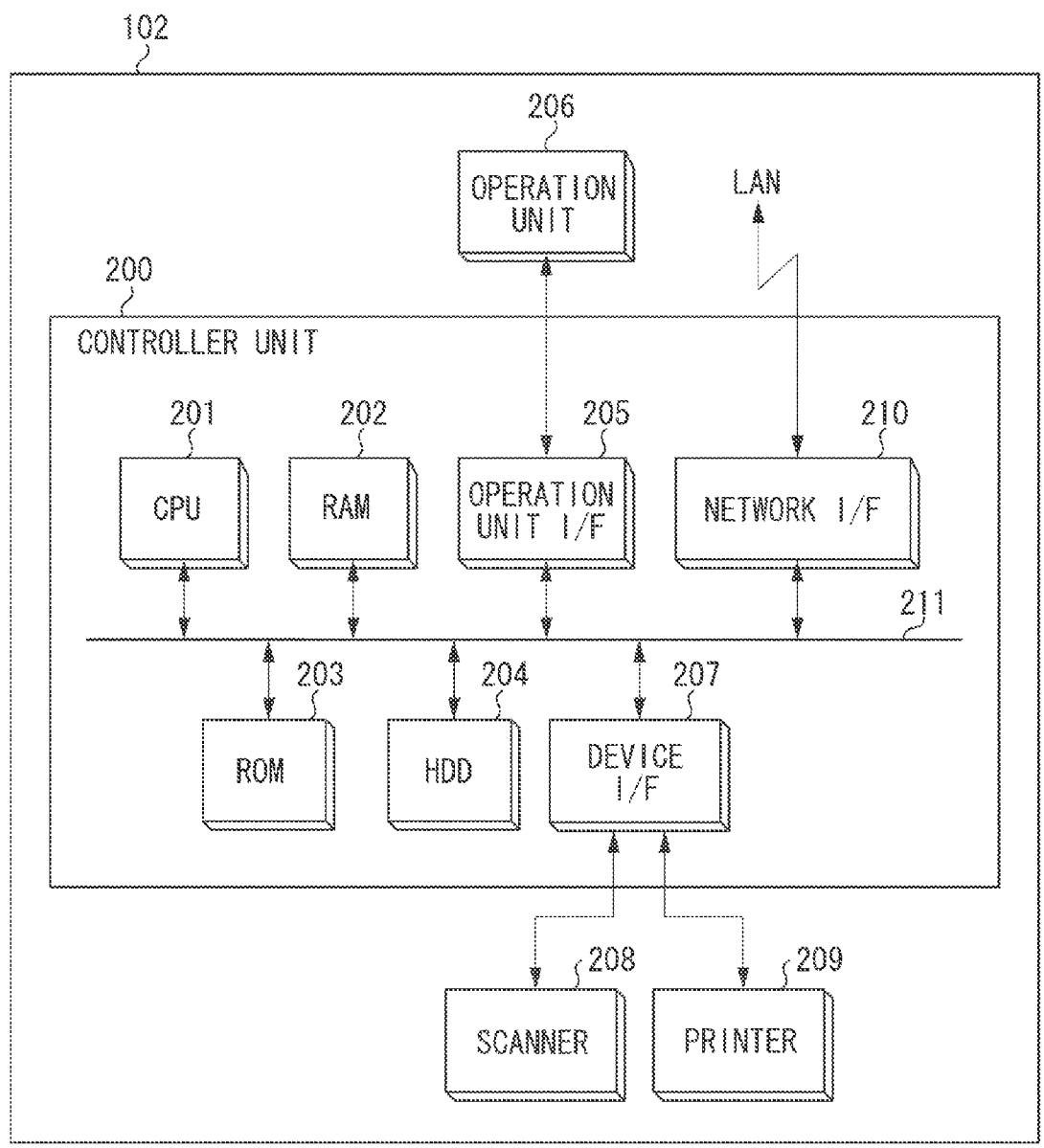
FIG. 3 is a hardware configuration of a multifunctional peripheral (MFP).

FIG. 3 illustrates a hardware configuration of the MFP 102.

The MFP 102 includes a controller unit 200, an operation unit 206, a scanner 208, and a printer 209. The controller unit 200 includes a CPU 201, a RAM 202, a read-only memory (ROM) 203, an HDD 204, an operation unit I/F 205, a device I/F 207, a network I/F 210, and a bus 211.

The CPU 201 performs various kinds of information processing according to a control program, and controls the operation unit 206, the scanner 208, and the printer 209. The CPU 201 also controls the network I/F 210 to perform communication processing with an external device.

The RAM 202 is a volatile storage device, and serves as a work memory of the CPU 201 to perform various kinds of information processing. The ROM 203 is a nonvolatile storage device used to store various kinds of control programs and setting values.

The HDD 204 includes a forcible reservation area 1101 and a box are 1102, which are described below, and stores received print data as a document (hereinafter, also referred to as reservation). The HDD 204 stores a computer-readable program for executing a flowchart described below, and setting values for determining an operation mode of the MFP 102. In this exemplary embodiment, as an example of the storage unit for storing print data, the HDD is described. But, the storage unit is not limited to the HDD, and a nonvolatile storage unit such as a solid-state drive (SSD) can be employed.

The programs stored in the ROM 203 or the HDD 204 are transferred to the RAM 202, and executed by the CPU 201. Based on the setting values transferred from the ROM 203 or the HDD 204 to the RAM 202, the MFP 102 operates.

The operation unit I/F 205 monitors a user input from the operation unit 206, and sends the input information to the CPU 201. The operation unit I/F 205 controls the operation unit 206 to display the information according to an instruction from the CPU 201. The operation unit 206 is an input device that receives an operation of a user from, for example, a touch panel or keys, and also serves as a display device such as a light-emitting diode (LED) or a liquid crystal display (LCD). The operation unit 206 can be a touch panel display that serves as both an input device and a display device. The operation unit 206 receives a user name and a password as authentication information for authentication processing, and receives input for starting printing of print data reserved in the HDD 204. Instead of the reception of the input of the authentication information by the operation unit 206, the reception of the input of the authentication information can be made by an IC card reader (not illustrated).

The device I/F 207 is an interface for connecting the scanner 208 or the printer 209. The device I/F 207 receives image data from the scanner 208 or sends the image data to the printer 209.

The scanner 208 illuminates a document to read the reflected light as digital data. The scanner 208 includes a document positioning glass for reading the document one side by one side. The scanner 208 further includes an auto document feeder (ADF) for sequentially reading a plurality of stacked sheets of the document.

The printer 209 prints an image on a sheet in an electrophotographic method. The printer 209 includes a sheet feeding mechanism for feeding a sheet from a sheet feeding tray, a mechanism for transferring and fixing an image, and a discharging mechanism for discharging the sheet from inside to the outside of the MFP 102. The printer 209 further includes a finishing mechanism as an additional function. The finishing function is also called a finisher. The finishing mechanism includes mechanisms for sorting printed products in sets, stapling, and folding the print products.

The MFP 102 provides a copy function using the scanner unit 208 and the printer 209. The CPU 201 makes the scanner 208 read an image, performs image processing onto the image data read by the scanner 208, and makes the printer 209 print the image-processed image data. The image processing can be performed by an image processing hardware other than the CPU 201. In the image processing, it is possible to perform image data processing such that print images read from different two sheets of the document are printed on one sheet (2 in 1).

The MFP 102 also provides a transmission function for transmitting image data read with the scanner 208 via the network I/F 210, and a fax function for transmitting image data read with the scanner 208 through a telephone line (not shown). When the MFP 102 does not provide the copy function, the transmission function, and the fax function, the MFP 102 can omit the scanner 208.

The network I/F 210 controls network communication through a LAN according to an instruction from the CPU 201. The network communication can be performed by wired communication such as Ethernet (registered trademark), or wireless communication such as Wi-Fi and Bluetooth®. The MFP 102 can include a USB I/F for communication through a USB cable.

A bus 211 is connected to the CPU 201, the RAM 202, the ROM 203, the HDD 204, the operation unit I/F 205, the device I/F 207, and the network I/F 210.

A program to be executed by the CPU 201 is stored in the ROM 203 or the HDD 204, and expanded in the RAM 202 when the MFP 102 starts or provides a function. The CPU 201 executes the program expanded in the RAM 202.

The CPU 201 controls the operation unit I/F 205 to display a message or an operation screen on the operation unit 206, and to acquire information input by a user with the operation unit 206.

The CPU 201 performs authentication processing for permitting a user who wants to use the MFP 102 to login the MFP 102. To determine whether the user is an authorized user who is permitted to use the MFP 102, the CPU 201 instructs the operation unit 206 to display an authentication screen, acquires the authentication information (a user name and a password) entered by the user with the operation unit 206, and performs user authentication based on the authentication information. When the user authentication is successfully performed, the CPU 201 acquires setting values (for example, a menu screen customized for the logged-in user, and a display language for the logged-in user) associated with the user, and controls the logged in screen based on the setting values.

Figure 4:
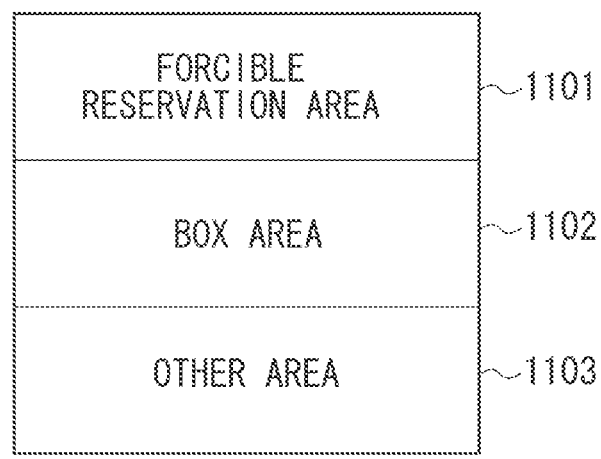
FIG. 4 illustrates storage areas in a hard disk.

FIG. 4 is a conceptual view illustrating sections of storage areas provided in the HDD 204. The HDD 204 includes a forcible reservation area 1101, a box area 1102, and the other area 1103.

The forcible reservation area 1101 serves as, when the MFP 102 is set to operate in the forcible reservation mode, a storage area for temporarily storing print data received from the PC 101. An instruction to print the print data stored in the forcible reservation area 1101 can be issued, in view of security, only by a user authenticated by an authentication unit (IC card authentication, or keyboard authentication). More specifically, to the print data sent from the PC 101, the user name of the user logging in the PC 101 is added, and the user name is associated with the print data as a job owner name to be stored in the forcible reservation area 1101. When the job owner name stored in the forcible reservation area 1101 corresponds to the user name of the user authenticated by the above-described authentication processing, printing of the image data is permitted.

The box area 1102 serves as a storage area for storing print data specified to be stored in the box area by the printer driver of the PC 101. The print data stored in the box area 1102 can be printed, sent, edited, or deleted regardless of whether the user is authenticated by the authentication unit or not. The data can be, however, locked with a password or encrypted as necessary.

The other area 1103 is an area other than the forcible reservation area 1101 and the box area 1102.

Figure 5:
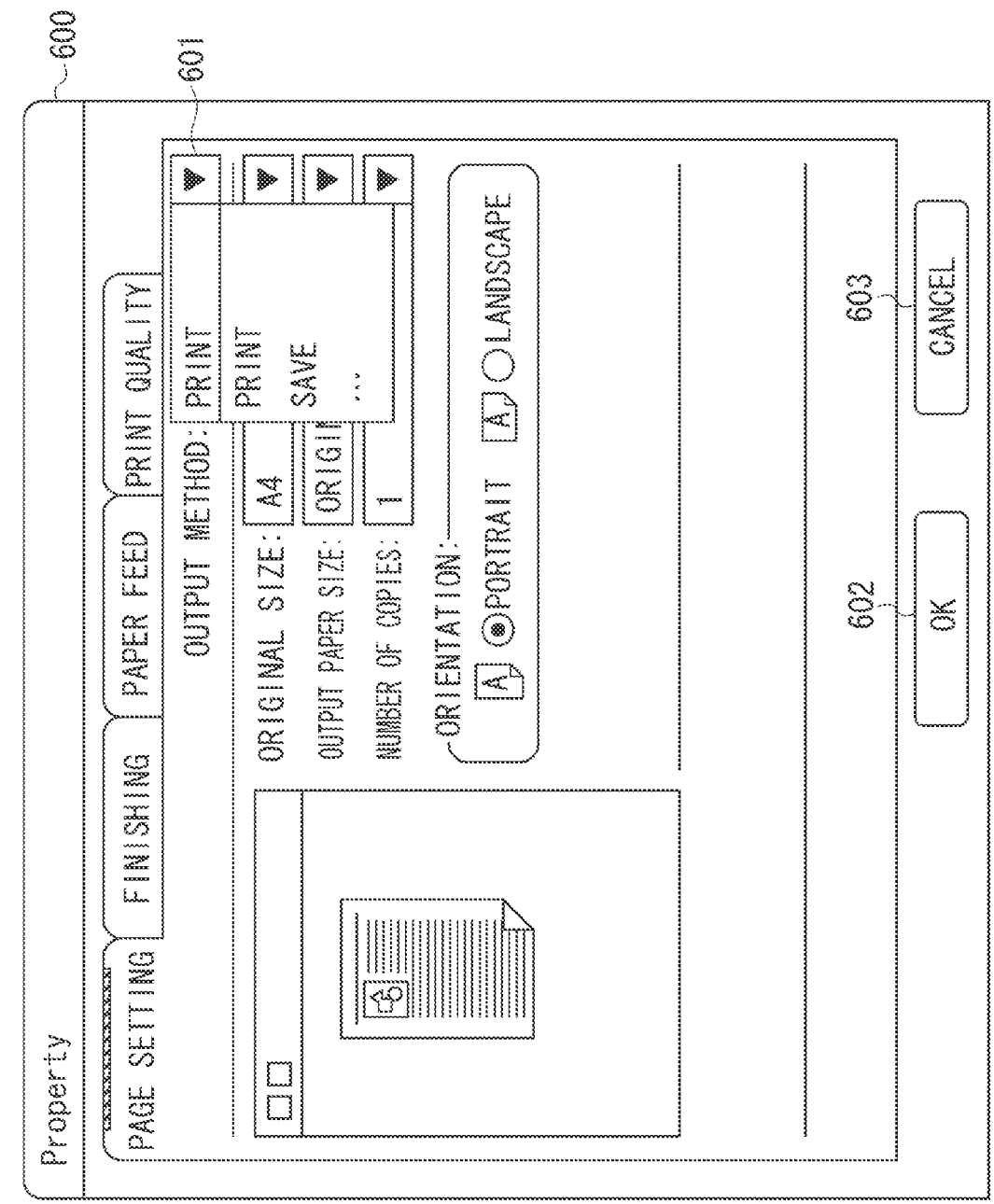
FIG. 5 illustrates a setting screen of a printer driver.

FIG. 5 is a setting screen displayed by the CPU 21 on the display device 24 of the PC 101. While a setting screen 600 is being displayed, the user can select to print or store the print data as an output method 601 of the print data. The user operates the input device 25 to click a button 602 to enable the setting of the output method 601.

If "PRINT" has been set as the output method 601, the printer driver of the PC 101 adds a command containing the information of the output method 601, and sends it to the MFP 102. Depending on whether an operation mode of the MFP 102 is the forcible reservation mode, in the MFP 102, different processing is performed onto the print data to be sent.

Specifically, if the MFP 102 is operating in the forcible reservation mode, the print data is stored in the forcible reservation area 1101 in the HDD 204. The print data stored in the forcible reservation area 1101 is printed in response to input of a print start instruction via the operation unit 206 by the user. As described above, when the MFP 102 is operating in the forcible reservation mode, the user can print the image data stored in the storage area at desired timing, and this can increase the security level. Further, the print products can be prevented from being left. Meanwhile, when the MFP 102 is not operating in the forcible reservation mode, the print data is not stored in the forcible reservation area 1101, and directly printed.

If "SAVE" has been set as the output method 601, the print data sent by the printer driver of the PC 101 is stored in the box area 1102 of the MFP 102. As described above, if "SAVE" has been set as the output method 601 at the PC 101 side, regardless of whether the MFP 102 is operating in the forcible reservation mode or not, the print data is stored in the box area 1102. To the data stored in the box area 1102, the user can issue an instruction of processing such as printing, editing, and deletion via the operation unit 206.

Figure 6:
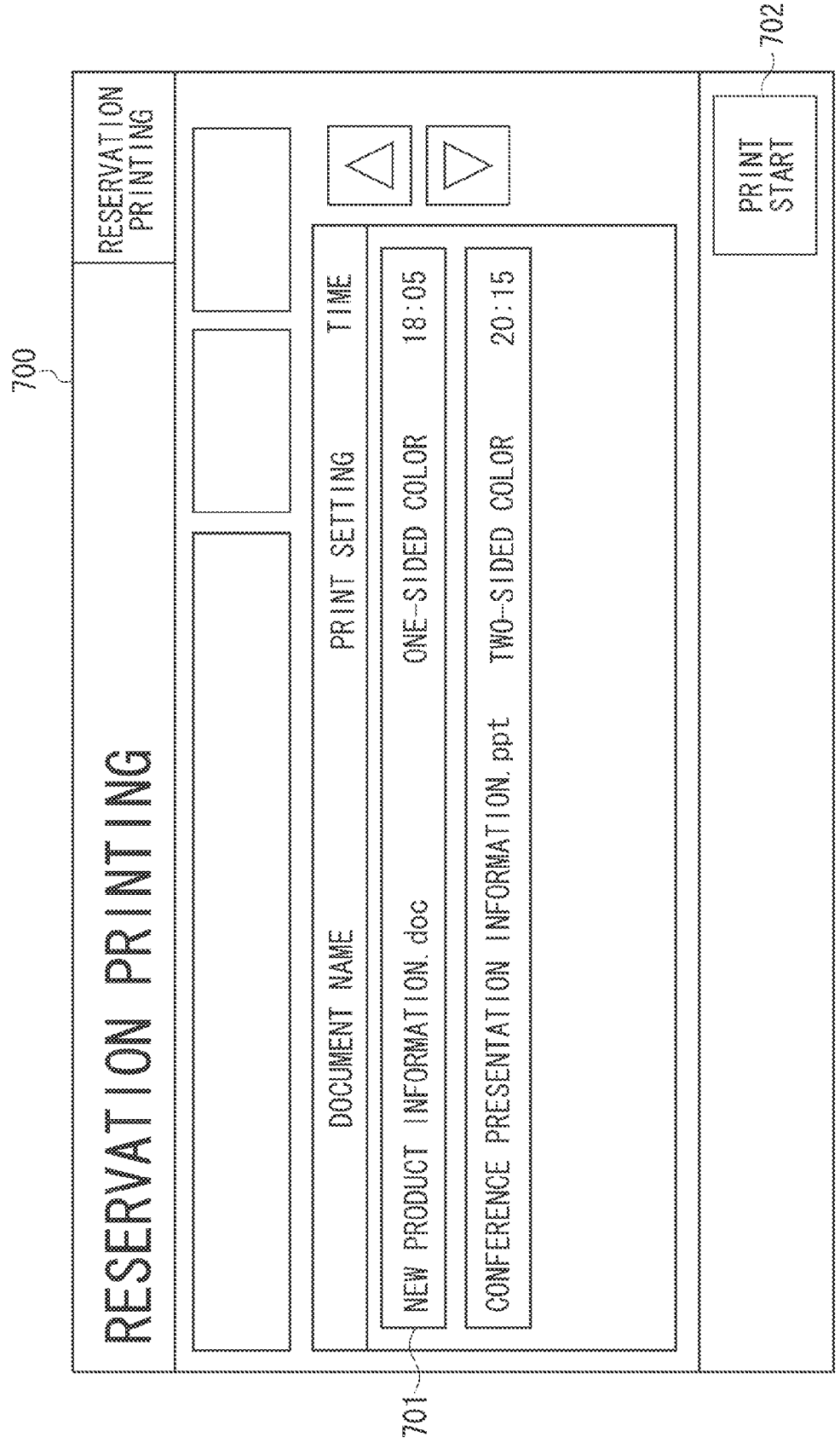
FIG. 6 is a list of print data being reserved in a forcible reservation area.

FIG. 6 illustrates a list of print jobs being reserved in the forcible reservation area 1101. If the MFP 102 is operating in the forcible reservation mode, the data of the print job (except print jobs specified to be stored in the box) sent from the PC 101 is reserved in the forcible reservation area 1101 in the HDD 204. Then, the CPU 201 reads the document name, print settings, and reception time associated with the data in the HDD 204 and stored in the HDD 204, and displays the information on the operation unit 206. If the user selects a print job 701 from the list in FIG. 6, and presses a print start button 702, the CPU 201 reads corresponding print data from the reservation area in the HDD 204, and instructs the printer 209 to print it.

Figure 7:
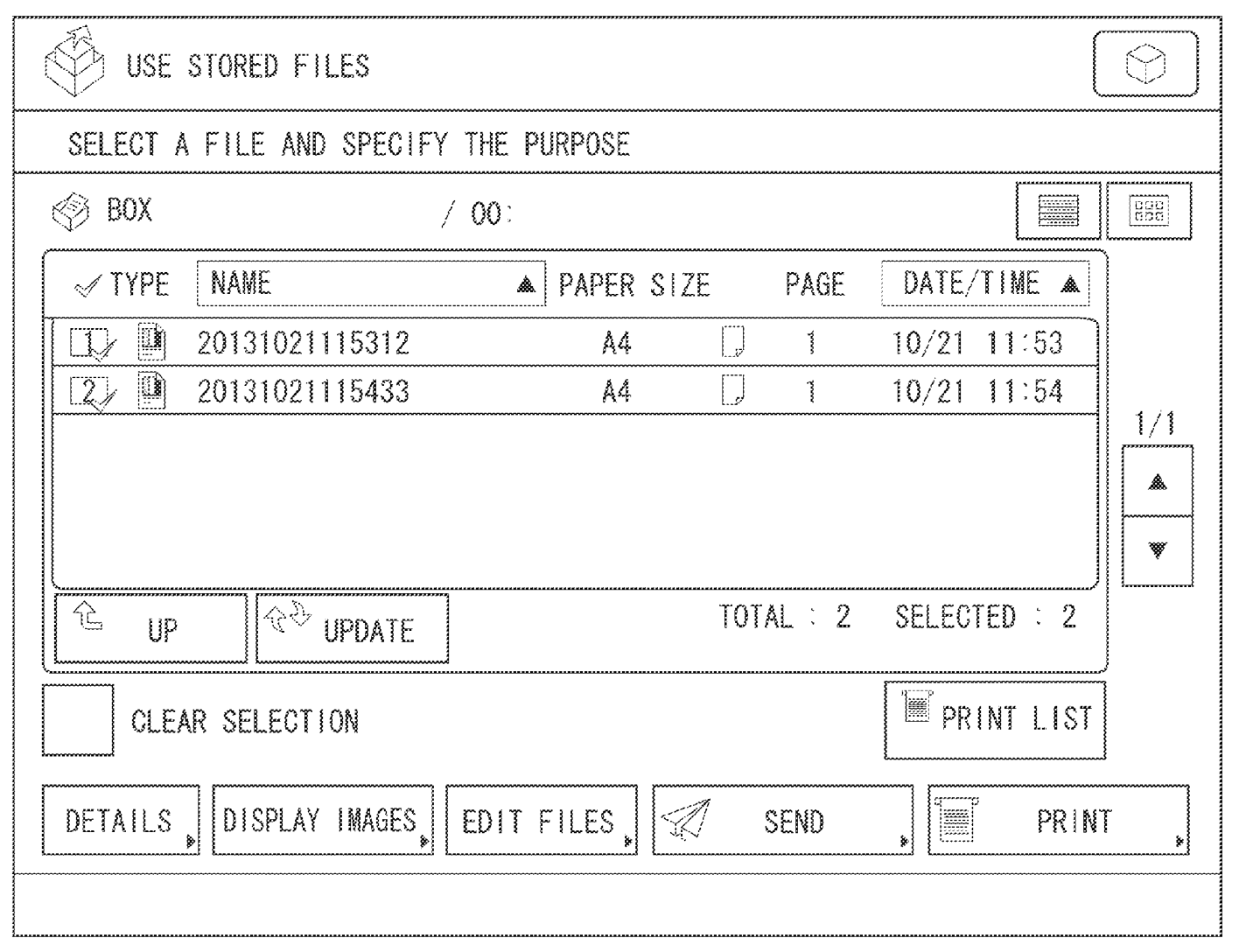

FIG. 7 illustrates a list of print jobs being stored in the box area 1102. The MFP 102 reserves the data of the print job specified to be stored in the box, the data being sent from the PC 101, in the box area 1102 in the HDD 204. When an instruction to display the list in FIG. 7 is input from the operation unit 206, the CPU 201 reads job attributes of the print data from the box area 1102 of the HDD 204, and displays the job attributes on the operation unit 206. If the user selects a print job from the list in FIG. 7 and presses the print start button, the CPU 201 reads corresponding print data from the box area 1102 in the HDD 204, and instructs the printer 209 to print it.

Figure 8:
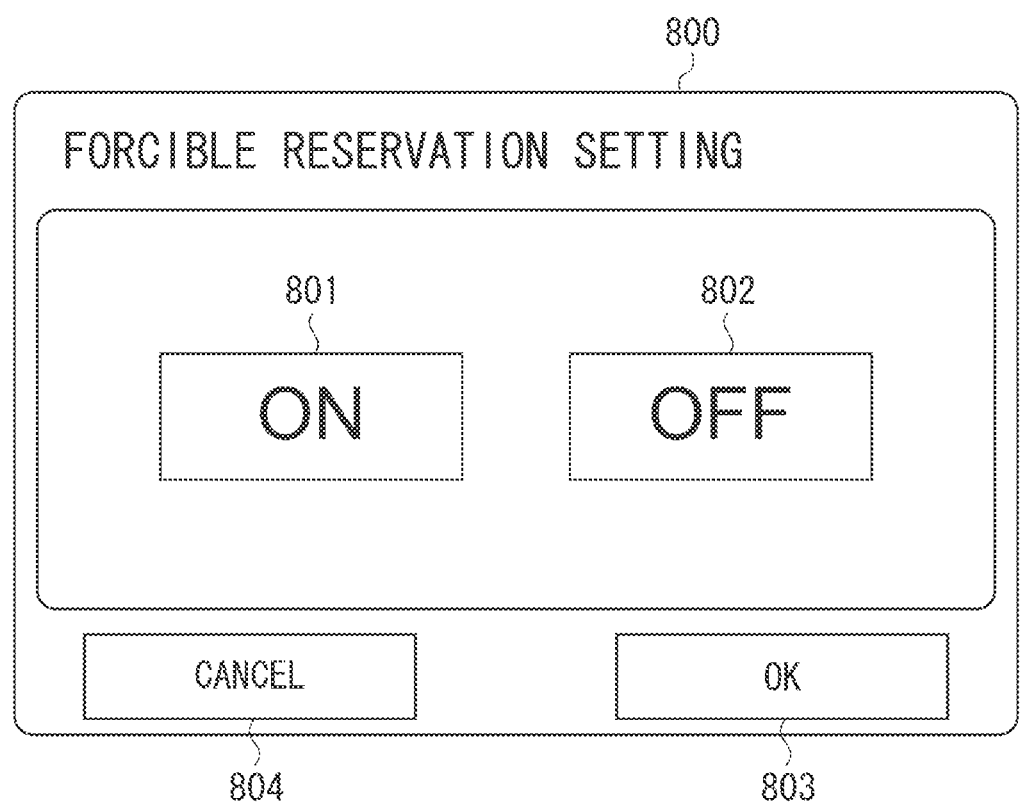
FIG. 8 is a setting screen for performing setting of a forcible reservation mode to the MFP.

FIG. 8 is a setting screen for performing setting of the forcible reservation mode. If the user selects a button 801 and presses an OK button 803, the forcible reservation mode is enabled. If the user selects a button 802 and presses the OK button 803, the forcible reservation mode is disabled. When the forcible reservation mode is enabled, received print data is stored in the forcible reservation area 1101.

The setting values in FIG. 8 are preset by an administrator and stored in the HDD 204, and read into the RAM 202 when the MFP 102 starts.

Figure 9:
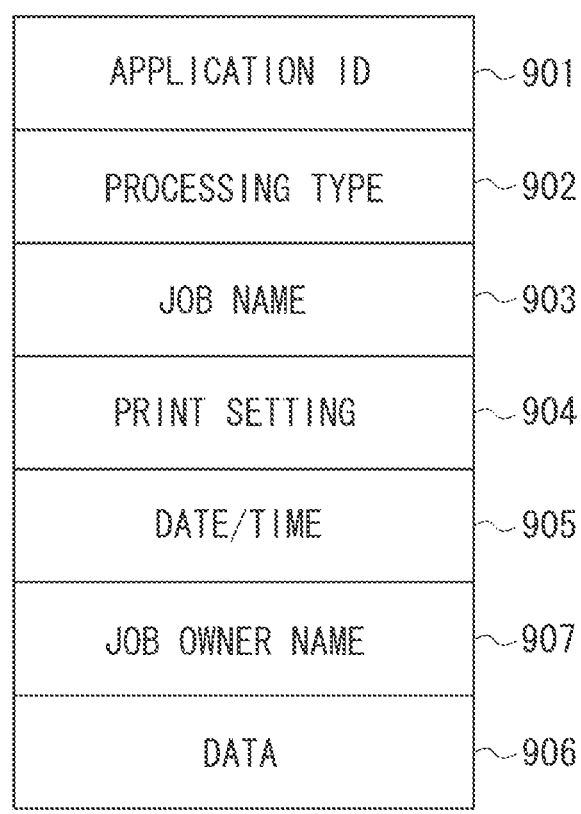
FIG. 9 illustrates job attributes.

FIG. 9 illustrates print data sent by the printer driver, and print job attributes associated with the print data. An application ID 901 is used for identification of a source (the printer driver of the PC 101, or an application in the MFP 102) of the print job. A processing type 902 indicates an output method (print or store) specified by the printer driver of the PC 101 when the printer driver is specified by the application ID. The processing type 902 indicates the information set in the output method 601 in FIG. 5. A job name 903 is a name of the job for printing the print data. A print setting 904 includes an output sheet size, an original size, the number of sheets, and a print orientation. A date/time 905 is a value indicating the reception date and time of the print data. A job owner name 907 indicates a user name of the user who has been logging in the PC 101.

Figure 10:
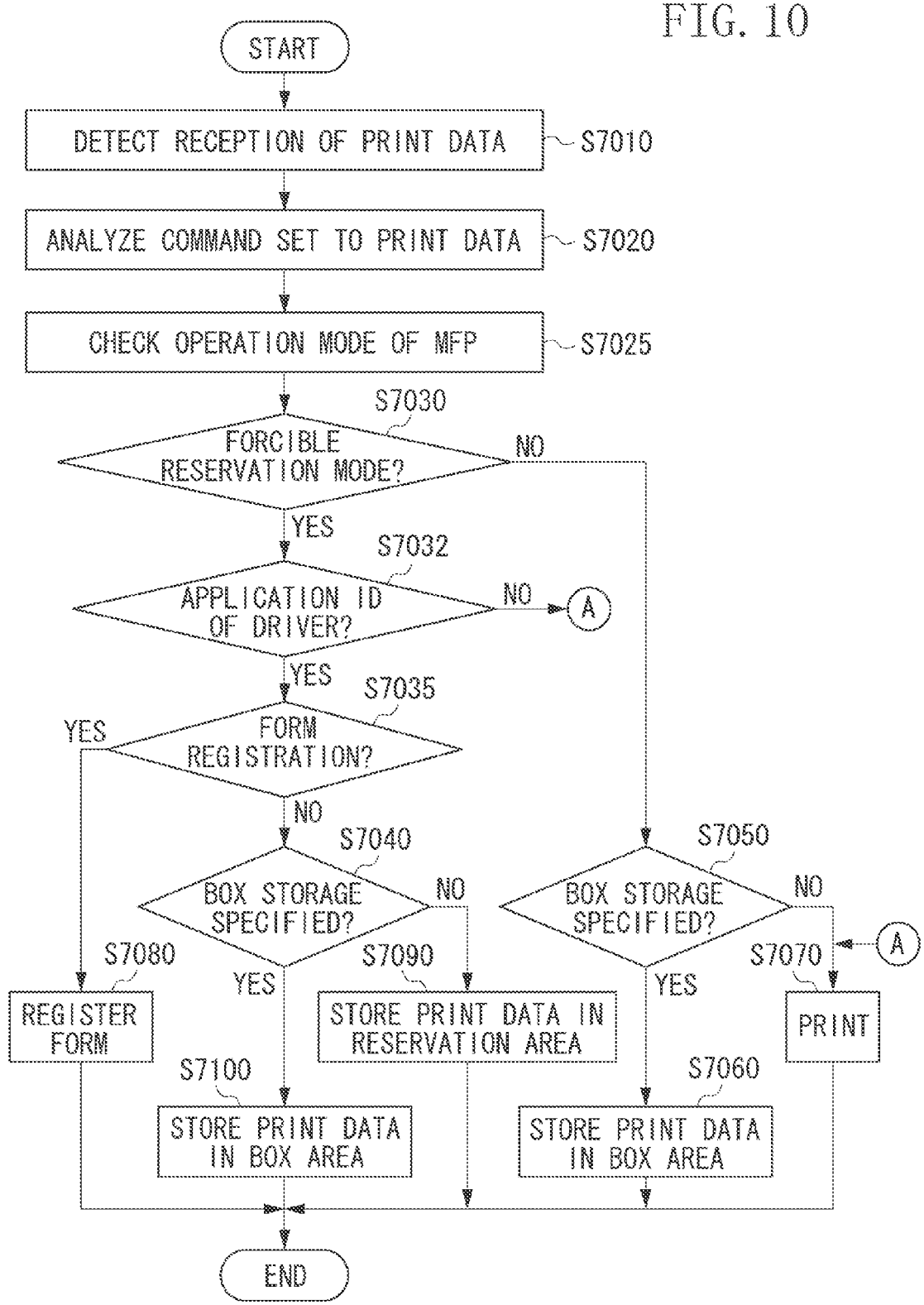
FIG. 10 is a flowchart illustrating a processing procedure in the MFP.

FIG. 10 is a flowchart illustrating an operation performed when the MFP 102 receives print data from the PC 101. Each step in FIG. 10 is implemented when the CPU 201 executes a program loaded from the HDD 204 into the RAM 202. Processing in FIG. 10 starts in response to reception of print data from the PC 101 by the MFP 102.

In this exemplary embodiment, the CPU 201 executes the following steps, however, the present invention is not limited to this example. For example, a plurality of CPUs can execute the following steps. Alternatively, a processor other than the CPUs can execute the following steps. The CPU 201 and a processor can cooperate with each other to execute the following steps.

In FIG. 10, in step S7010, the network I/F 210 detects reception of print data from the PC 101, and in step S7020, the CPU 201 analyzes a command added to the received print data. The command includes at least the application ID 901, the processing type 902 (print or store), the job name 903, the print setting 904, and the job owner name 907. The CPU 201 extracts the information contained in the command, and stores the information as attributes of the print job corresponding to the received print data into the HDD 204. In this processing, the information of the reception time of the print data is also stored as an attribute of the print job.

In step S7025, the CPU 201, to check an operation mode of the MFP, acquires the setting value stored in the RAM 202. The setting value has been set by the administrator who performed the setting on the setting screen in FIG. 8, and the setting value is read from the HDD 204 into the RAM 202 at the time of the start of the MFP 102. In step S7030, the CPU 201, based on the acquired setting value, determines whether the MFP 102 is operating in the forcible reservation mode. If the CPU 201 determines that the MFP 102 is not operating in the forcible reservation mode (NO in step S7030), the CPU 201 processes the print data according to the output method included in the command received with the print data. Specifically, if the processing type 902 in the command has been specified to store the data in the box area 1102 (YES in step S7050), in step S7060, the CPU 201 stores the received print data in the box area 1102 in the HDD 204. If the processing type 902 in the command received with the print data has been specified to print the data (NO in step S7050), in step S7070, the CPU 201 instructs the printer 209 to print the received print data.

If the CPU 201 determines that the MFP 102 is operating in the forcible reservation mode (YES in step S7030), in step S7032, based on the command analyzed in step S7020, the CPU 201 determines whether the received print data is an application ID of the printer driver. If the CPU 201 determines that the print data is not an application ID of the printer driver (NO in step S7032), in step S7070, the CPU 201 does not reserve the received print data in the forcible reservation area 1101, and instructs the printer 209 to print the data.

If the CPU 201 determines that the print data is an application ID of the printer driver (YES in step S7032), in step S7035, the CPU 201 determines whether the received print data is the data for registration of a form. If the CPU 201 determines that the data is for registration of a form (YES in step S7035), in step S7080, the CPU 201 registers the received print data as a form.

If the CPU 201 determines that the data is not for registration of a form (NO in step S7035), in step S7040, the CPU 201 checks the processing type 902 in the command received with the print data to check the output method specified by the printer driver of the PC 101.

If the CPU 201 determines that the box storage is specified as the output method (YES in step S7040), in step S7100, the CPU 201 stores the print data in the box area 1102 in the HDD 204. If the CPU 201 determines that printing is specified as the output method (NO in step S7040), in step S7090, the CPU 201 stores the print data in the forcible reservation area 1101 in the HDD 204.

As described above, the flowchart in FIG. 10 has been described.

The user can issue an instruction to start printing of the print data stored in the forcible reservation area 1101 or the box area 1102 at desired timing from the list in FIG. 6 or FIG. 7 displayed on the operation unit 206.

FIG. 11 illustrates data to be stored in the HDD 204 as attributes of the received print job. The data is an example of a value of the application ID 901 of the print job attribute. A value of the application ID 901 of the print job input from the printer driver is 0001-10992 (1201). A value of the application ID 901 of the print job input from the operation unit 206 of the MFP 102 is 0002-12123 (1202).

Figure 12:
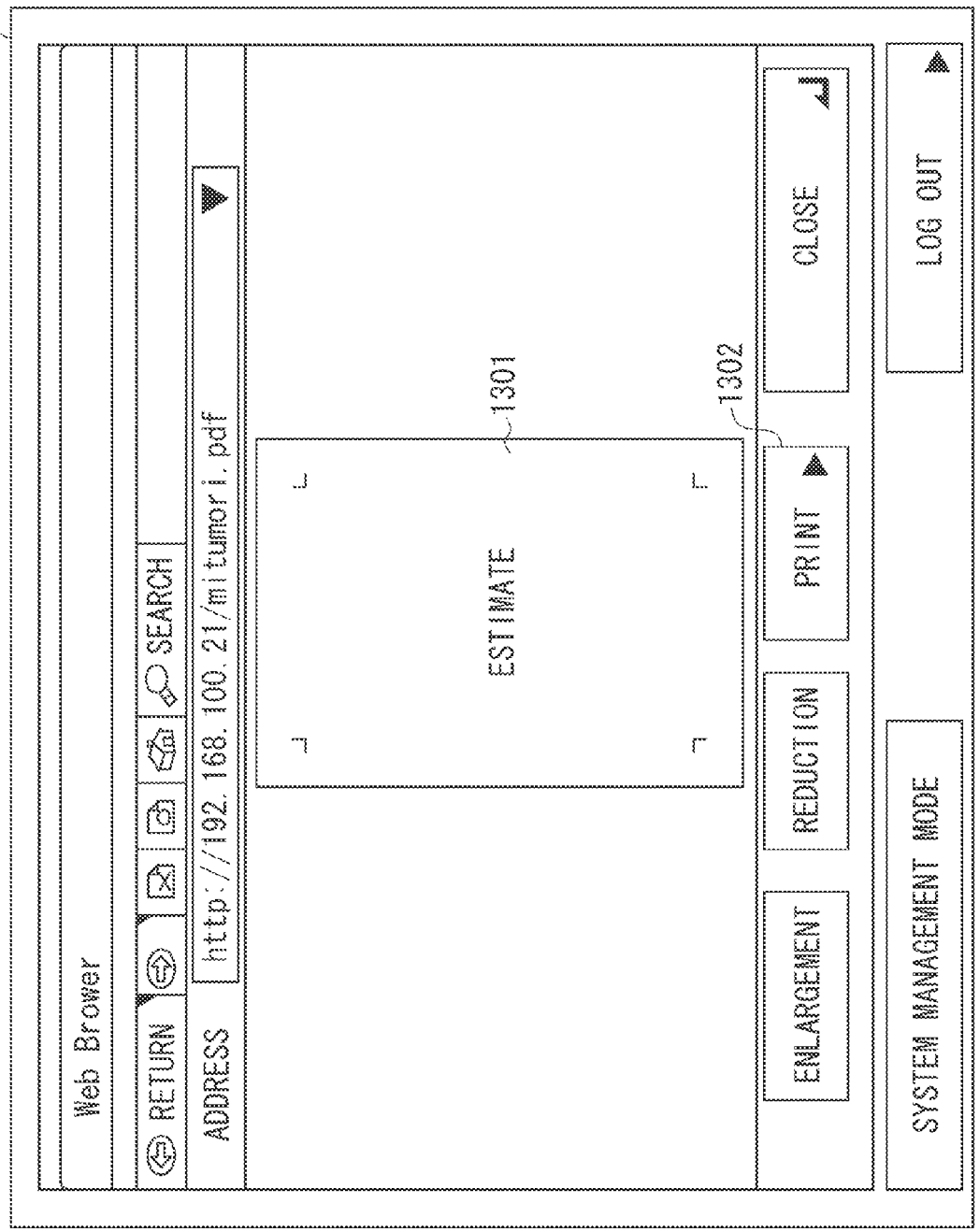
FIG. 12 illustrates a screen for specifying and executing pull printing from an operation unit of an image forming apparatus.

FIG. 12 illustrates a screen 1300 for specifying a document in the PC 101 from the operation unit 206 in the MFP 102 to print (pull print) the document. The screen in FIG. 12 is displayed on the operation unit 206. The MFP 102 temporarily stores a document 1301 in the PC 101 via a network 311 into the RAM 202. The MFP 102 reads the document 1301 stored in the RAM 202, and displays it on the operation unit 206. When the user presses a print button 1302, the MFP 102 converts the document 1301 into print data, and performs printing by the printer 209. Other types of pull printing can also be employed, however, in this exemplary embodiment, the description is omitted.

According to the exemplary embodiment, with respect to the print data sent from the PC 101, the print data being specified to be stored in the box by the printer driver is reserved in the box area, not in the forcible reservation area. This enables the user to separately manage the print job explicitly instructed to be reserved at the PC 101 side by the user and the print job forcibly reserved by the operation mode in the MFP 102, and the user's convenience can be increased.

According to the exemplary embodiment, it can be prevented that the same data is simultaneously reserved in the forcible reservation area 1101 and the box area 1102. In a case where a command added to print data sent from the PC 101 contains both a print instruction and a storage instruction, however, the MFP 102 can store the print data in both the forcible reservation area 1101 and the box area 1102.

According to the exemplary embodiment, in the printing system for performing pull printing by specifying the document 1301 in another information processing apparatus via the operation unit 206 of the MFP 102, the input job is printed without reserving it in the temporary storage area, and this increases the convenience.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-248034 filed Nov. 29, 2013, which is hereby incorporated by reference herein in its entirety.

What is claimed is:

1. An image forming apparatus communicable with an information processing apparatus over a network, the image forming apparatus comprising:
   a setting unit which is implemented by at least one processor and sets a forcible reservation mode in which print data received from the information processing apparatus is reserved forcibly at the image forming apparatus;
   a network interface which receives print data, to which either a print command or a save command is added, from the information processing apparatus over the network;
   a storage, having at least a first storage area and a second storage area, capable of storing the print data in the first storage area or the second storage area;
   an operation unit interface which receives from a user a print start instruction to start printing the print data stored in the first storage area or the second storage area;
   a printer which prints an image based on the print data the printing of which is instructed; and
   a control unit which is implemented by at least one processor and performs control for storing the print data into the first storage area in a case where the forcible reservation mode is set by the setting unit and where the command added to the print data is the print command or for storing the print data into the second storage area in a case where the forcible reservation mode is set by the setting unit and where the command added to the print data is the save command.

2. The image forming apparatus according to claim 1, wherein the printer is configured to print an image in response to input of the print start instruction via the operation unit interface based on the print data stored in the first storage area or the second storage area.

3. The image forming apparatus according to claim 1, wherein the print command and the save command are added by a printer driver of the information processing apparatus.

4. The image forming apparatus according to claim 1, wherein the print data stored in the first storage area is managed for each user, and
   wherein the control unit permits to print the print data when a job owner of the print data stored in the first storage area corresponds to the user who has been logging in the image forming apparatus.

5. The image forming apparatus according to claim 4, wherein the control unit, irrespective of whether the user has been logging in the image forming apparatus, permits to print the print data stored in the second storage area.

6. The image forming apparatus according to claim 1, wherein the control unit, when the image forming apparatus is not operating in the forcible storage mode, permits to print the externally input print data without storing the print data in the first storage area.

7. A non-transitory computer-readable storage medium storing a program for causing an image forming apparatus to function as each unit of the image forming apparatus according to claim 1.

8. A method for controlling an image forming apparatus communicable with an information processing apparatus over a network, the image forming apparatus including a storage having at least a first storage area and a second storage area, the method comprising:
   setting a forcible reservation mode in which print data received from the information processing apparatus is reserved forcibly at the image forming apparatus;
   receiving print data, to which either a print command or a save command is added, from the information processing apparatus over the network;
   storing the print data into the first storage area in a case where the forcible reservation mode is set and where the command added to the print data is the print command or storing the print data into the second storage area in a case where the forcible reservation mode is set and where the command added to the print data is the save command;
   receiving from a user a print start instruction to start printing the print data stored in the first storage area or the second storage area; and
   printing an image based on the print data the printing of which is instructed.

9. An image forming apparatus capable of communicating with an external device that transmits print data on the basis of a transmission instruction issued by a transmission user, the image forming apparatus using a storage unit capable of storing print data, an image forming unit that forms an image on the basis of print data and a display unit capable of displaying information, the image forming apparatus comprising:
   a controller having a processor which executes instructions stored in a memory or having circuitry;
   the controller being configured to:
      receive a setting of one mode among a plurality of modes including a first mode and a second mode;
      acquire print data, of which execution of printing has been designated, from the external device and cause the image forming unit to form an image on the basis of the acquired print data, in a state in which the first mode has been set;
      acquire print data, of which the storage unit has been designated, from the external device and cause the storage unit to store the acquired print data so that printing is enable to be instructed on a first screen displayed by the display unit, in a state in which the first mode has been set;
      acquire print data, of which execution of printing has been designated, from the external device and cause the storage unit to store the acquired print data so that printing is enable to be instructed on a second screen displayed by the display unit, in a state in which the second mode has been set; and
      acquire print data, of which the storage unit has been designated, from the external device and cause the storage unit to store the acquired print data so that printing is enable to be instructed on the first screen displayed by the display unit, in a state in which the second mode has been set.

10. The image forming apparatus according to claim 9, wherein the image forming apparatus is able to use an authentication unit being capable of performing authentication by correlating an operation user to the transmission user,
   wherein information on print data displayed on the first screen is information on print data associated with an authenticated user, and wherein information on print data displayed on the second screen is information not based on a result of the authentication by the authentication unit.

11. The image forming apparatus according to claim 9,
wherein the controller is able to receive a print instruction issued for print data displayed on the first screen,
wherein the controller is able to receive a print instruction issued for print data displayed on the second screen, and
wherein the controller is able to receive a transmission instruction issued for the print data displayed on the second screen.

12. The image forming apparatus according to claim 9,
wherein the print data, of which the execution of printing has been designated, is print data to which a print command has been added by a driver of the external device, and
wherein the print data, of which the storage unit has been designated, is print data to which a save command has been added by a driver of the external device.

13. The image forming apparatus according to claim 9, wherein the controller further performs processes of:
acquiring first print data, of which execution of printing has been designated, from the external device and causing the storage unit to store the acquired first print data so that printing is enable to be instructed on the second screen displayed by the display unit, in a state in which the second mode has been set; and
acquiring second print data from an obtainment source that is different from the external device and causing the image forming unit to form an image on the basis of the acquired second print data, in a state in which the second mode has been set.

14. A method for controlling an image forming apparatus that is capable of communicating with an external device that transmits print data on the basis of a transmission instruction issued by a transmission user, and that uses a storage unit capable of storing print data, an image forming unit that forms an image on the basis of print data and a display unit capable of displaying information, the method comprising:
receiving a setting of one mode among a plurality of modes including a first mode and a second mode;
acquiring print data, of which execution of printing has been designated, from the external device and causing the image forming unit to form an image on the basis of the acquired print data, in a state in which the first mode has been set;
acquiring print data, of which the storage unit has been designated, from the external device and causing the storage unit to store the acquired print data so that printing is enable to be instructed on a first screen displayed by the display unit, in a state in which the first mode has been set;
acquiring print data, of which execution of printing has been designated, from the external device and causing the storage unit to store the acquired print data so that printing is enable to be instructed on a second screen displayed by the display unit, in a state in which the second mode has been set; and
acquiring print data, of which the storage unit has been designated, from the external device and causing the storage unit to store the acquired print data so that printing is enable to be instructed on the first screen displayed by the display unit, in a state in which the second mode has been set.

15. A non-transitory computer-readable storage medium storing a program for controlling an image forming apparatus that is capable of communicating with an external device that transmits print data on the basis of a transmission instruction issued by a transmission user, and that uses a storage unit capable of storing print data, an image forming unit that forms an image on the basis of print data and a display unit capable of displaying information, the program comprising the processes of:
receiving a setting of one mode among a plurality of modes including a first mode and a second mode;
acquiring print data, of which execution of printing has been designated, from the external device and causing the image forming unit to form an image on the basis of the acquired print data, in a state in which the first mode has been set;
acquiring print data, of which the storage unit has been designated, from the external device and causing the storage unit to store the acquired print data so that printing is enable to be instructed on a first screen displayed by the display unit, in a state in which the first mode has been set;
acquiring print data, of which execution of printing has been designated, from the external device and causing the storage unit to store the acquired print data so that printing is enable to be instructed on a second screen displayed by the display unit, in a state in which the second mode has been set; and
acquiring print data, of which the storage unit has been designated, from the external device and causing the storage unit to store the acquired print data so that printing is enable to be instructed on the first screen displayed by the display unit, in a state in which the second mode has been set.

* * * * *